United States Patent
Benyamin et al.

(10) Patent No.: US 11,909,554 B2
(45) Date of Patent: *Feb. 20, 2024

(54) PERIOD BASED BIDIRECTIONAL COMMUNICATION INCLUDING TRANSFER OF CONTROL INFORMATION VIA LOW POWER REFRESH SIGNALING

(71) Applicant: Marvell Asia Pte, Ltd., Santa Clara, CA (US)

(72) Inventors: Saied Benyamin, Calabassas, CA (US); Seid Alireza Razavi Majomard, Belmont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,463

(22) Filed: Oct. 11, 2022

(65) Prior Publication Data

US 2023/0133507 A1  May 4, 2023

Related U.S. Application Data

(63) Continuation of application No. 17/013,410, filed on Sep. 4, 2020, now Pat. No. 11,469,920, which is a continuation of application No. 16/419,643, filed on May 22, 2019, now Pat. No. 11,296,904.

(51) Int. Cl.
| | |
|---|---|
| *G06F 1/00* | (2006.01) |
| *H04L 12/40* | (2006.01) |
| *G06F 1/3203* | (2019.01) |
| *H04L 12/02* | (2006.01) |
| *G06F 1/26* | (2006.01) |
| *G06F 1/3209* | (2019.01) |

(52) U.S. Cl.
CPC ...... *H04L 12/40045* (2013.01); *G06F 1/3203* (2013.01); *H04L 12/02* (2013.01); *G06F 1/26* (2013.01); *G06F 1/3209* (2013.01)

(58) Field of Classification Search
CPC .. H04L 12/40045; H04L 12/02; G06F 1/3203
USPC ....................................................... 713/300
See application file for complete search history.

(56) References Cited

U.S. PATENT DOCUMENTS

| | | | |
|---|---|---|---|
| 6,732,190 B1 * | 5/2004 | Williams | G06F 1/3209 713/323 |
| 8,156,359 B1 * | 4/2012 | Sedarat | G06F 1/325 370/278 |
| 9,577,708 B1 * | 2/2017 | McClellan | H04B 3/46 |
| 2004/0091038 A1 * | 5/2004 | Agazzi | H04L 25/03987 375/233 |

(Continued)

*Primary Examiner* — Volvivk Derose

(57) ABSTRACT

An Ethernet transceiver is disclosed. The Ethernet transceiver includes transceiver circuitry to couple to one end of an Ethernet link. The transceiver circuitry includes transmit circuitry to transmit high-speed Ethernet data along the Ethernet link at a first data rate and receiver circuitry. The receiver circuitry includes adaptive filter circuitry and correlator circuitry. The receiver circuitry is responsive to an inline signal to operate in a low-power alert mode with the adaptive filter circuitry disabled and to receive alert signals from the Ethernet link simultaneous with transmission of the Ethernet data by the transmit circuitry. The alert signals are detected by the correlator circuitry and include a sequence of alert intervals exhibiting encoded data at a second data rate less than the first data rate.

19 Claims, 4 Drawing Sheets

(56) References Cited

U.S. PATENT DOCUMENTS

| | | | |
|---|---|---|---|
| 2007/0104124 A1* | 5/2007 | Lee | H04L 12/10 370/311 |
| 2009/0097392 A1* | 4/2009 | Diab | H04L 12/40136 370/248 |
| 2009/0154455 A1* | 6/2009 | Diab | H04L 47/10 370/389 |
| 2009/0154467 A1* | 6/2009 | Diab | H04L 12/4013 370/395.4 |
| 2009/0154473 A1* | 6/2009 | Diab | H04L 47/263 370/400 |
| 2009/0154593 A1* | 6/2009 | Diab | H04L 47/10 375/295 |
| 2009/0158069 A1* | 6/2009 | Oh | G06F 1/3203 713/323 |
| 2009/0201976 A1* | 8/2009 | Shrikhande | H04M 11/062 375/222 |
| 2009/0256674 A1* | 10/2009 | Lee | G06K 19/07 340/5.6 |
| 2010/0046543 A1* | 2/2010 | Parnaby | H04L 12/12 370/465 |
| 2010/0104056 A1* | 4/2010 | Taich | H04L 7/0083 375/359 |
| 2011/0103275 A1* | 5/2011 | Rhelimi | H04L 25/4906 370/296 |
| 2013/0189932 A1* | 7/2013 | Shen | H04W 52/0232 455/561 |
| 2018/0062514 A1* | 3/2018 | Dong | H02M 3/158 |
| 2018/0309538 A1* | 10/2018 | Verma | H04L 1/0002 |
| 2019/0082385 A1* | 3/2019 | Shellhammer | H04L 47/25 |
| 2019/0128936 A1* | 5/2019 | Brown | G01R 27/28 |
| 2019/0369709 A1* | 12/2019 | Mayer | H04N 1/00904 |
| 2020/0288396 A1* | 9/2020 | Park | H04L 27/26 |

* cited by examiner

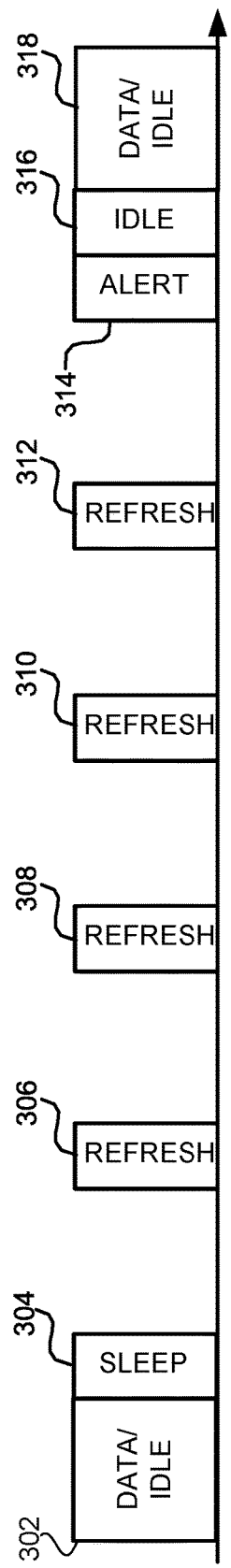
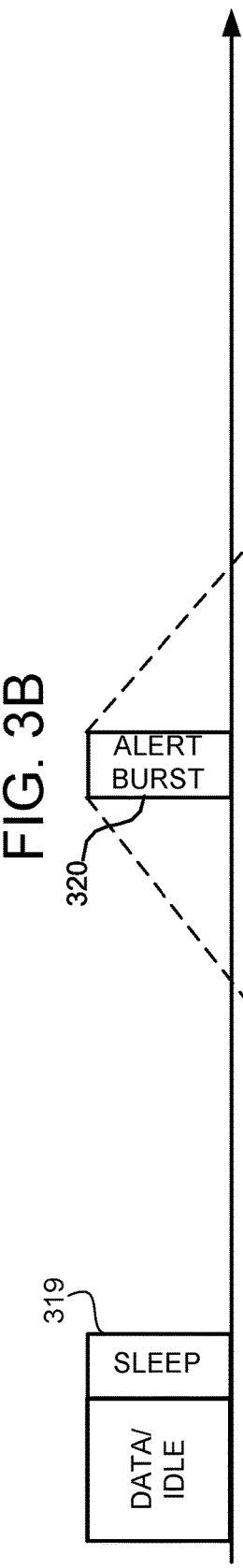
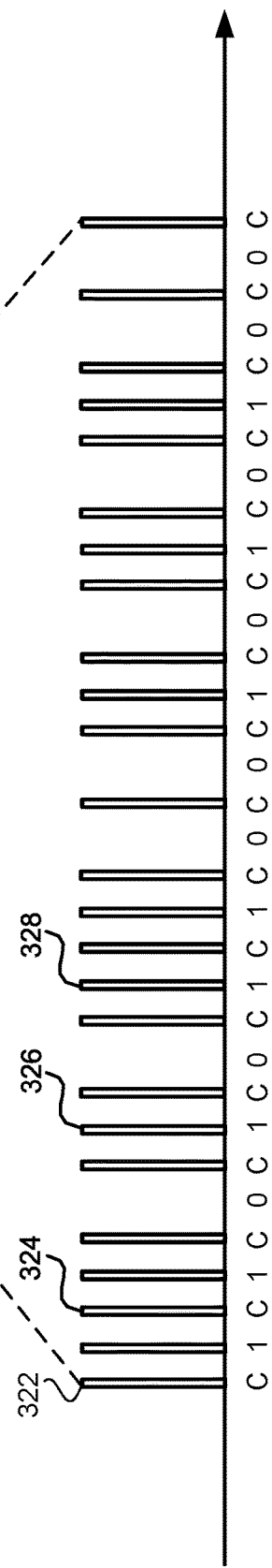

PERIOD BASED BIDIRECTIONAL COMMUNICATION INCLUDING TRANSFER OF CONTROL INFORMATION VIA LOW POWER REFRESH SIGNALING

RELATED APPLICATIONS

This Application is a Continuation of U.S. patent application Ser. No. 17/013,410, filed Sep. 4, 2020, entitled ASYMMETRIC ENERGY EFFICIENT ETHERNET, which is a Continuation of U.S. patent application Ser. No. 16/419,643, filed May 22, 2019, entitled ASYMMETRIC ENERGY EFFICIENT ETHERNET, now U.S. Pat. No. 11,296,904, all of which are expressly incorporated by reference herein.

TECHNICAL FIELD

The disclosure herein relates to communications systems, and more specifically to high-speed Ethernet systems and methods.

BACKGROUND

High-speed Ethernet standards, such as 10 GBASE-T and NBASE-T, generally utilize four wired physical channels with the ability to achieve aggregated data rates from 1 Gbps up to 10 Gbps. The links are often bursty, where data transfers typically occur during a small portion of the time that the links are active. The transceiver circuitry, however, consumes power at all times while the links are active.

To minimize power consumption during periods of no data transfer, a low power mode of operation, commonly referred to as Energy Efficient Ethernet (EEE), has now been standardized. The low-power mode involves periodically transmitting refresh symbols between link partners to keep the link "active." The refresh symbols generally allow each link partner to update its filter coefficients and timing information to maintain synchronization with the other link partner.

While beneficial for its intended applications, the EEE low-power mode for 10 GBASE-T Ethernet transceivers specifies fixed refresh periods and fixed quiet periods regardless of the signaling environment associated with the link. This may result in significant inefficiencies for the link while operating in the low-power idle mode.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3A illustrates various transferred signals across a data link between master and slave devices during a legacy low-power mode of operation.

FIG. 3B illustrates an improved low-power mode of operation that provides a low-power alert mode of communication with receive-side DSP circuitry powered down.

FIG. 3C illustrates one embodiment of a data-encoded alert burst sequence.

DETAILED DESCRIPTION

Methods and apparatus for Ethernet network, transceivers and links are disclosed. In one embodiment, an Ethernet transceiver is disclosed. The Ethernet transceiver includes transceiver circuitry to couple to one end of an Ethernet link. The transceiver circuitry includes transmit circuitry to transmit high-speed Ethernet data along the Ethernet link at a first data rate and receiver circuitry. The receiver circuitry includes adaptive filter circuitry and correlator circuitry. The receiver circuitry is responsive to an inline signal to operate in a low-power alert mode with the adaptive filter circuitry disabled and to receive alert signals from the Ethernet link simultaneous with transmission of the Ethernet data by the transmit circuitry. The alert signals are detected by the correlator circuitry and include a sequence of alert intervals exhibiting encoded data at a second data rate less than the first data rate.

Figure 1:
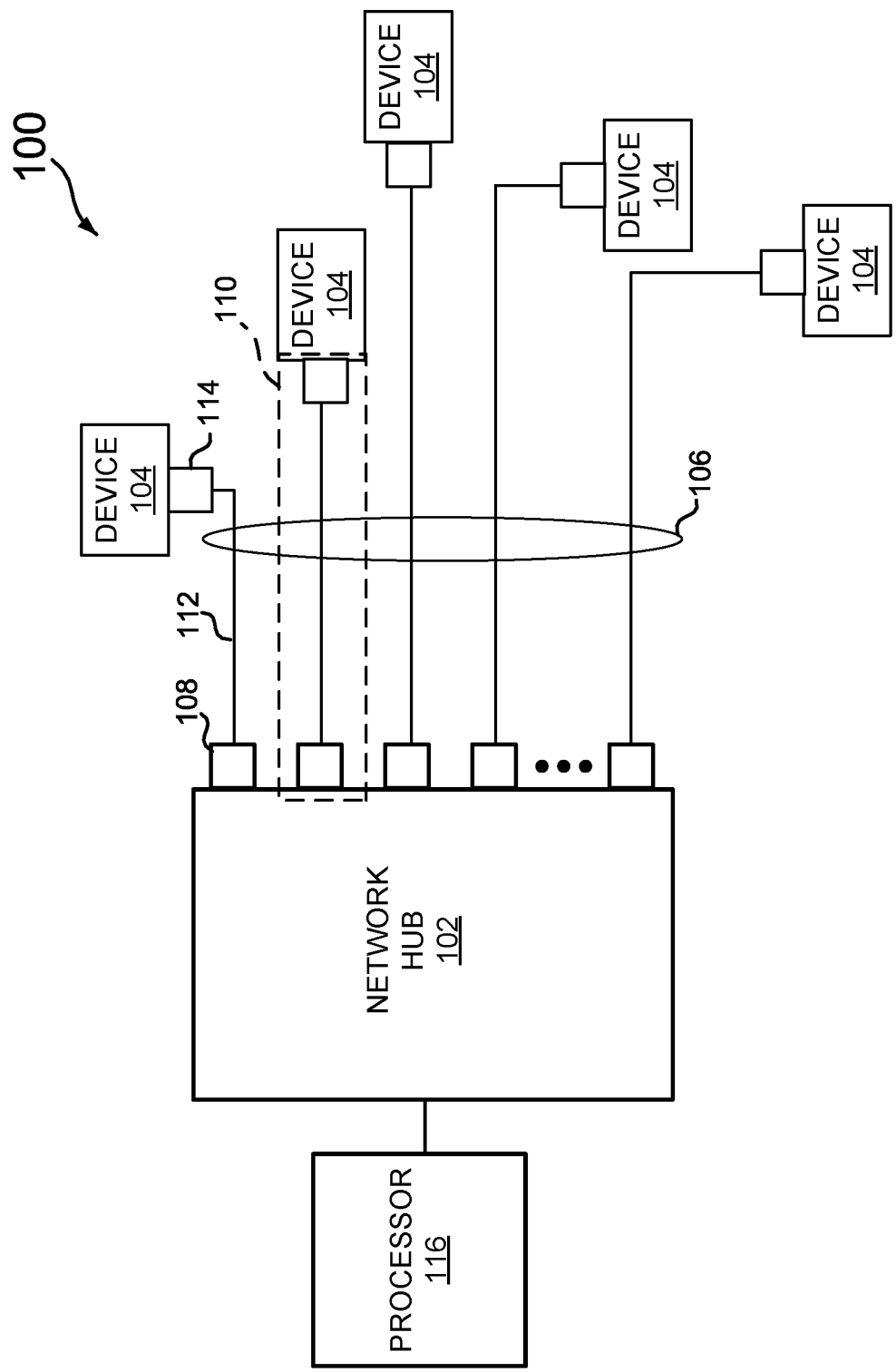
FIG. 1 illustrates one embodiment of an Ethernet network.

Referring now to FIG. 1, one embodiment for a high-speed Ethernet network, generally designated 100, includes a network hub 102 that interfaces with multiple network devices 104, via internally-routed wired signaling media 106. For one embodiment, the entire system is self-contained within a fixed framework, such as a body of a motor vehicle, aircraft or boat.

Further referring to FIG. 1, the network hub 102 may take the form of a network switch or router to direct traffic between various network nodes defined by the network devices 104. The network hub 102 may include, for example, forty-eight ports 108 to support an equal number of data links 110. Each port 108 connects to a local end of an Ethernet cable 112. A remote end of each cable 112 connects to a network device port 114, connected to, for example, a sensor, video camera or telematics data monitoring device. For one embodiment, each network device 104 generates data associated with, for example, imaging information from a certain angle of a right-front fender area of an automobile. Multiple nodes or network devices 104 may thus feed parameter data to the network hub 102, which may then direct the data to, for example, one or more processors 116 to evaluate the data and provide command and control signals to, for example, an autonomous driving system.

Figure 2:
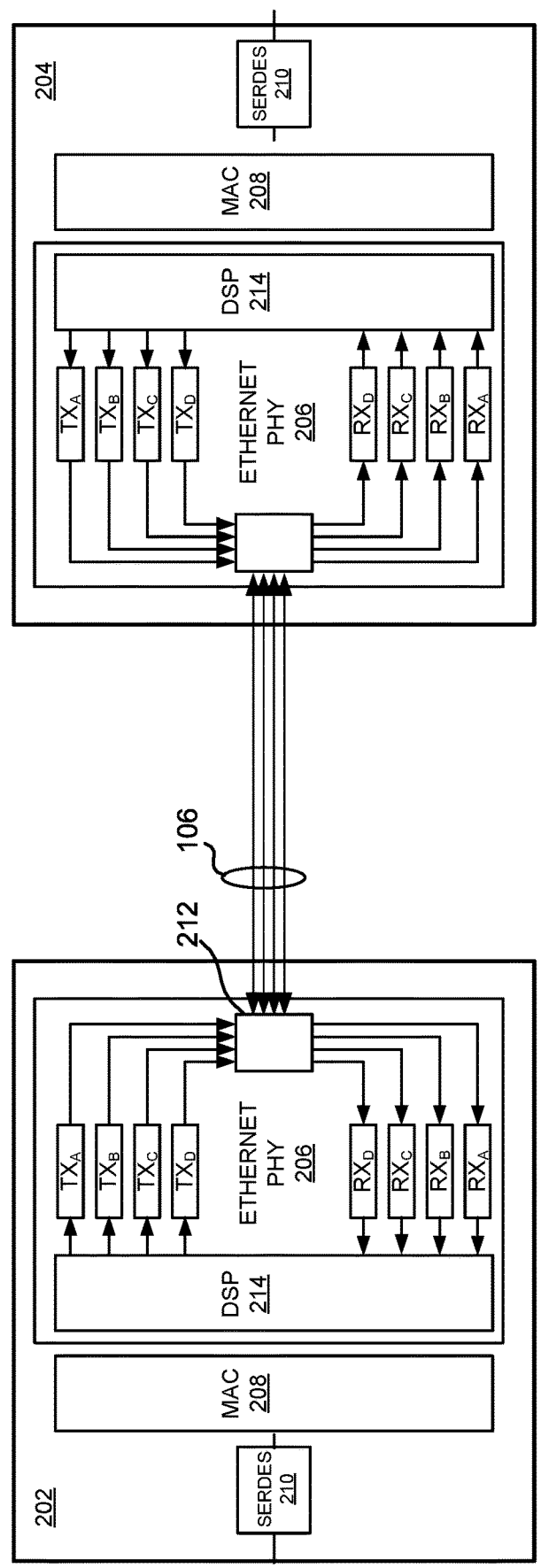
FIG. 2 illustrates one embodiment of a bidirectional Ethernet link with multiple channels employed in the Ethernet network of FIG. 1.

FIG. 2 illustrates one embodiment of a data link 110 used in the network of FIG. 1. Each of the data links 110 includes a local Ethernet transceiver 202 and a remote transceiver 204. The local transceiver 202 is disposed in one of the ports 108 of the network hub 102, while the remote transceiver is disposed on a network device 104. For purposes of brevity, only the local transceiver circuitry will be described, with the understanding that the remote transceiver circuitry is similarly formed.

Further referring to FIG. 2, for one embodiment, the local transceiver 202 comprises a 10 GBASE-T integrated circuit chip that incorporates a physical circuit (PHY) 206, a media access controller (MAC) 208, and a serializer/deserializer (SERDES) interface 210. The PHY 206 incorporates an analog front-end that employs four input/output (I/O) driver/receiver circuits TXA/RXA, TXB/RXB, TXc/RXc and TXD/RXD to transceive data over four physical channels in accordance with a 10 GBASE-T protocol. The transceiver I/O circuits interface with the Ethernet cable media 106 via a connector interface, at 212. The PHY 206 includes digital signal processing (DSP) logic 214 that provides interference cancellation functionality in response to noise and interference thresholds based on signaling media. As more fully explained below, the DSP logic may be powered down in certain circumstances while the PHY maintains the ability to receive low-power and low-speed data transfers. The MAC circuit 124 interfaces the PHY 102 with a SERDES circuit 128. While most of the discussion herein emphasizes use of a 10 GBASE-T transceiver integrated circuit (IC) chip, NBASE-T transceiver IC chips that offer variable data rates between 1 Gbps up to 25 Gbps may also be employed.

In some embodiments, each of the channels described above may operate as a single bidirectional signaling lane. For such embodiments, the local and remote transceivers 202 and 204 may be configurable as "master" and "slave" devices. When configured as a "master" device, a transceiver provides a timing signal embedded in data transfers to the slave, such that the link maintains timing synchronization. Since the reference timing signal originates with the "master", no clock-data recovery (CDR) operations are required at the receive circuitry of the "master" device. A "slave" device, on the other hand, has its CDR circuitry enabled to receive data from the "master" and extract timing information from the data. In other embodiments, the channels may be configured as dedicated transmit and receive lanes.

In some applications, data transfers along the links of FIGS. 1 and 2 may involve significant amounts of data from a given network device to the network hub (referred to herein as a downstream path), while little to no data may transfer from the network hub to the network device (referred to herein as an upstream path). An example of such an asymmetric link might involve a video camera that generates image data for transfer along the downstream path, while occasionally receiving control and/or command information from the network hub along the upstream path.

In an effort to significantly reduce power consumption below that of the legacy EEE low-power idle mode, one embodiment described herein provides an asymmetric link where high-speed data transfers are supported in one direction along a link, while a very low-power alert mode of operation is employed for data transfers encoded in a low data rate protocol. A minimum feature set for the low-power alert mode corresponds to the currently standardized Energy Efficient Ethernet (EEE) low-power idle mode of operation, consistent with the standardized EEE mode in Institute of Electrical and Electronics Engineers (IEEE) 802.3az. FIG. 3A illustrates a timing diagram showing symbols transmitted over time via the data links described above consistent with the legacy EEE low-power idle mode. A given link enters the mode by ending a data transfer with an idle symbol, at 302. A "sleep" symbol is immediately sent to place the link in a low-power state, at 304. Periodic refresh symbols, such as at 306, 308, 310 and 312 are sent along the link to maintain timing synchronization. The refresh symbols allow the link partner to update its filters using adaptive algorithms while the link is in its low-power state. The first low-power mode in this EEE state enables for a fast return to active link status when ready. The link wakes up through use of an alert signal, at 314, followed by a wake symbol or series of idles, at 316. The alert signal allows detection without propagating data through the DSP of the receive channel. An idle symbol may then be provided, at 318, and then true data. Since filter updates were periodically carried out while the link was "inactive", the link does not need any training and may be brought up from the low-power state into a fully-operational state.

The minimum feature set for the low-power idle mode described above generates default refresh signals that enable the DSP to maintain convergence in its adaptive filter coefficient values. However, the power dissipated in maintaining even limited DSP operations may still be prohibitive. To achieve further power savings for the Ethernet links, a modified low-power alert mode of operation may employed to achieve significantly lower power reductions, as more fully explained below.

Referring now to FIGS. 3B and 3C, a modified low-power mode of operation generally provides a data encoding feature to provide low-speed data transferred in a burst of encoded alert events or pulses. As noted above in discussing the legacy EEE low-power idle mode, alert pulses are low-power signals that are detectable by a receiver even with most of the receiver circuitry (such as the DSP and adaptive filters) powered down. FIG. 3B illustrates a scenario involving a power-down of the DSP logic at a receive end of the link, such that no refresh pulses are needed to maintain convergence of the adaptive filters. The low-power alert mode may be initiated through receipt of an inline code similar to, for example, the EEE legacy "sleep" code, such as at 319. After initiating the low-power alert mode, one or more low-power alert bursts may be sent, at 320, with a sequence of alert intervals that are encoded with data. No refresh pulses are sent since the DSP is powered down, including the adaptive filters (which need no refreshing while powered down).

FIG. 3C illustrates one specific embodiment of alert burst encoding involving a sequence of thirty-three equally-spaced alert intervals. The intervals may be spaced based on the bandwidth requirement of the low-speed communication channel. Odd-numbered intervals, such as at 322 and 324 may be designated for clock pulses C to provide low-speed timing information to a receive-side alert signal detector (not shown) or correlator. Even-numbered alert intervals, such as at 326 and 328, provide data bits, with the presence of a pulse representing a logic "1", while the absence of a pulse represents a logic "0." With the specific embodiment described above, a total of sixteen bits may be transferred in the alert burst with the DSP essentially powered down. Of course, variations of the specific alert-based protocol may be implemented in various ways, depending on the application.

Figure 4:
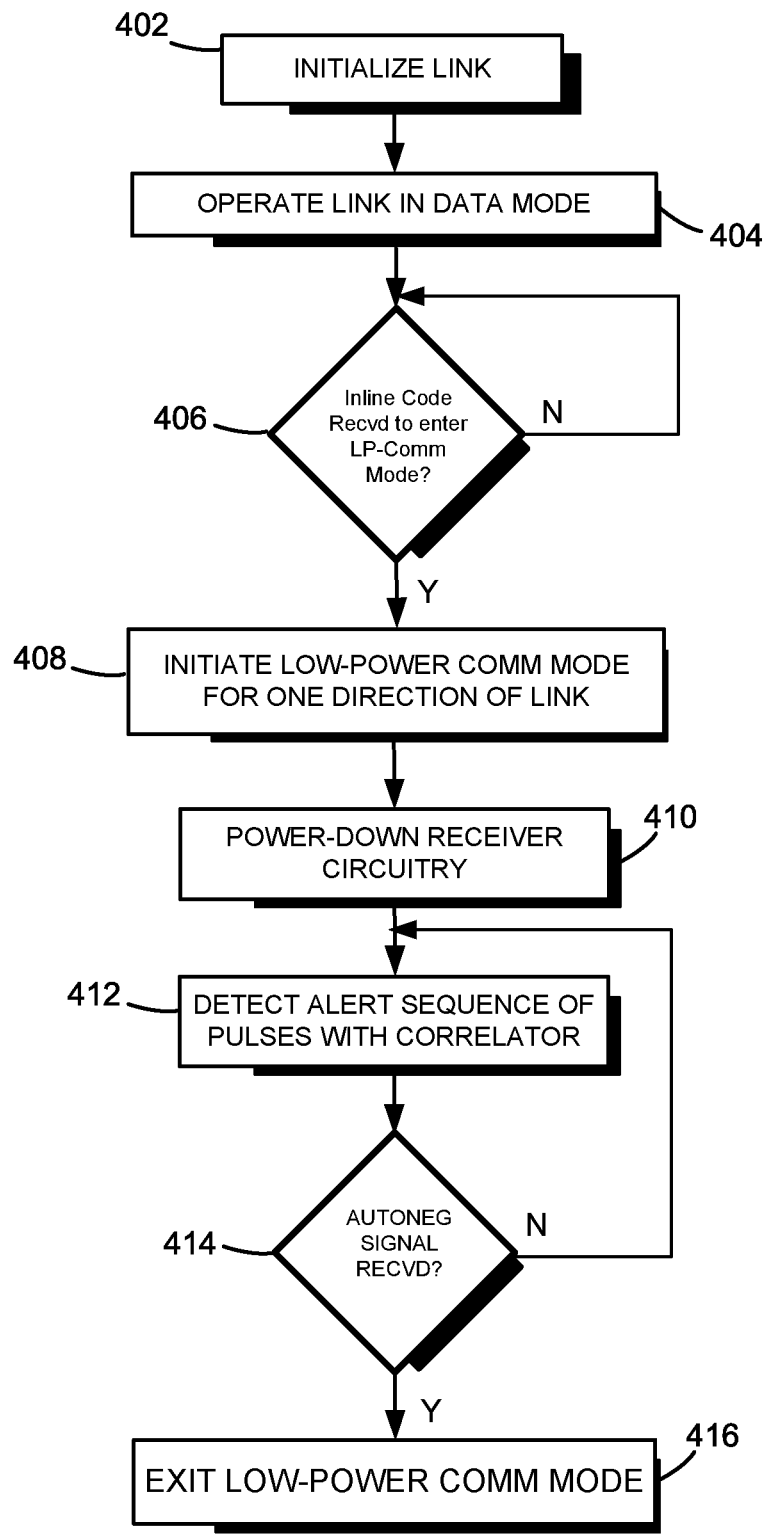
FIG. 4 illustrates one embodiment of steps in a method of operating an Ethernet transceiver device.

FIG. 4 illustrates a flowchart of steps consistent with the description above in the context of an Ethernet link that includes the ability to operate in the low-power alert mode of operation. At 402, the link is initialized during, for example, a power-up period corresponding to a startup sequence or other link training sequence. The initialization sequence of steps may involve having the link partners perform one or more handshake or synchronization operations that may also include an operating mode designation, such as a conventional low-power idle mode, or an improved low-power mode such as the low-power alert mode described herein. Following initialization, the link may be operated in a data mode such that at least one direction of the link transfers high-speed Ethernet data at, for example 10 Gbps.

Should it be desired to operate the link asymmetrically, with the other direction operating at a much lower data rate, and with little to no power dissipation, an inline code may be sent between link partners to setup the link for the low-power alert mode. At 406, if the inline code is received by one of the link partners, then the low-power alert mode is initiated, at 408, creating a low-power low-speed communication channel in the direction opposite the high-speed data transfer direction. For embodiments utilizing single-lane simultaneous bidirectional channels, with one link partner identified as a master and the other link partner identified as a slave, to keep clock recovery features active, generally only the slave transmit to master receive direction will go into low power alert mode.

Further referring to FIG. 4, following initiation of the low power alert mode, the link partner to receive the low-speed data enters a power-down state, at 410, where the DSP and associated adaptive filter circuits are powered down. Low-speed command and control data may then be encoded and transferred by transmit circuitry from the transmit end of the link as part of an alert burst. A correlator or alert detector at the receive end detects the alert sequence, at 412, and decodes the data, which may be in the form of command and/or control signals. Multiple such alert bursts may be transmitted at very low power levels to achieve a low-power low-speed communication channel.

At some point, the low-power alert mode may be terminated with the transmission and detection of, for example, an autonegotiation signal, at 414.

The network architecture described above lends itself well to autonomous driving applications where bursty data rates upwards of 8 Gbps to 10 Gbps may be necessary in one direction to transfer vast swaths of data generated by numerous video cameras and sensors, and low-speed command and control signals are sent in the other direction to the cameras and sensors. By incorporating a BASE-T Ethernet network, such as NBASE-T or 10 GBASE-T, or higher, within an autonomous driving system, proven high-speed communications within an automotive environment may be realized. Additionally, by altering the Ethernet communications channels to support a low-power alert mode, significant power savings may be realized for assymetric data transfer applications.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A network device, comprising:
   a transceiver for coupling to a link partner transceiver over a wired bidirectional channel, the transceiver including
      a transmitter for communicating with the link partner transceiver over a downstream path of the wired bidirectional channel, and
      a receiver for communicating with the link partner transceiver along an upstream path of the wired bidirectional channel; and
   a controller configured to cause the transceiver to communicate with the link partner transceiver during a plurality of operating periods, the operating periods including:
      a first operating period in which the transmitter is configured in a data transfer mode to transmit data signals to the link partner transceiver along the downstream path at a first signaling rate, and a second operating period in which the receiver is configured in a low-power mode to receive low power refresh signals that are encoded with information from the link partner transceiver, the receiver being configured to receive the information from the low power refresh signals at a second signaling rate that is different than the first signaling rate, the controller being responsive to the information to control an operation of the transceiver during the second operating period.

2. The network device of claim 1, wherein the receiver is configured to decode the information as a command signal or as a control signal for dispatch to the controller.

3. The network device of claim 1, wherein the controller is configured to cause the transceiver to communicate with the link partner transceiver during a third operating period in which at least one of the transmitter and the receiver is inactive from data transfers.

4. The network device of claim 3, wherein the controller is configured to cause the transceiver to communicate with the link partner transceiver during the third operating period in which at least one of the transmitter and the receiver is configured to perform a network operation other than an operation to transmit or receive data.

5. The network device of claim 3, wherein, during the third operating period, the transceiver is configured to operate in an initialization mode of operation for training the transmitter and the receiver to communicate with the link partner transceiver.

6. The network device of claim 3, wherein, during the third operating period, the receiver is configured to operate in a second low-power mode of operation in which the receiver receives other refresh signals from the link partner transceiver along the upstream path to maintain synchronization with the link partner transceiver.

7. The network device of claim 1, wherein the network device comprises at least one data generation device, the at least one data generation device being configured to generate data associated with operating a motor vehicle, an aircraft, or a boat.

8. The network device of claim 1, wherein the network device comprises a network hub that is configured to receive network data from at least one data generation device.

9. The network device of claim 1, wherein:
the wired bidirectional channel comprises at least one conductor; and
the downstream path and the upstream path comprise the same at least one conductor.

10. A method of operating a network device, the network device including a transceiver for coupling to a link partner transceiver over a wired bidirectional channel, the transceiver including a transmitter and a receiver, the method comprising communicating between the network device and the link partner transceiver over the wired bidirectional channel in a plurality of operating periods, and the communicating including:
transmitting first data signals during a first operating period in which the transmitter is configured in a data transfer mode to transmit data signals from the transmitter to the link partner transceiver along a downstream path over the wired bidirectional channel at a first signaling rate;
receiving, during a second operating period in which the receiver is configured in a low-power mode of operation, low-power refresh signals that are encoded with information, the low-power refresh signals received along an upstream path over the wired bidirectional channel at a second signaling rate that is different than the first signaling rate;
decoding the information from the low-power refresh signals during the second operating period; and
controlling, during the second operating period, an operation of the transceiver in response to the information.

11. The method of claim 10, further comprising performing a network operation other than an operation to transmit or receive data signals during the second operating period with at least one of the transmitter and the receiver.

12. The method of claim 10, further comprising generating the data signals with the network device, the data signals associated with operating a motor vehicle, an aircraft, or a boat.

13. The method of claim 10, wherein operating at least one of the transmitter and the receiver during the second operating period comprises operating the at least one of the transmitter and the receiver in the low-power mode for transmitting and/or receiving the low-power refresh signals to maintain convergence of adaptive filter coefficient values.

14. The method of claim 10, wherein:
the wired bidirectional channel includes at least one conductor; and
the communicating between the network device and the link partner transceiver further comprises transmitting the data signals and receiving the low-power refresh signals over the at least one conductor.

15. The method of claim 14, wherein the communicating between the network device and the link partner transceiver further comprises:
transmitting the data signals during a first time interval; and
receiving the low-power refresh signals during a second time interval that at least partially overlaps with the first time interval.

16. A networking system within a closed operating environment, comprising:
a wired signaling medium;
a network hub comprising a First transceiver coupled to at least one bidirectional channel over the wired signaling medium; and
at least one network device, the at least one network device comprising a second transceiver communicatively coupled to the network hub via a respective bidirectional channel over the wired signaling medium,
wherein the network hub and the at least one network device are configured to communicate with each other over the bidirectional channel in a plurality of operating periods, the operating periods including
a first operating period in which the network device is configured in a data transfer mode to transmit data signals to the network hub along a downstream path over the bidirectional channel at a first signaling rate, and
a second operating period in which the network hub is configured in a low-power mode to transmit low-power refresh signals that are encoded with information to the network device along an upstream path over the bidirectional channel at a second signaling rate that is different than the first signaling rate, and
wherein the network device is configured to decode the information from the low-power refresh signals and is responsive to the information to control an operation of the second transceiver.

17. The networking system of claim 16, wherein the network hub is configured to communicate with the at least one network device during a third operating period in which at least one of the network hub and the at least one network device is configured to perform updates for a network operation other than transmitting or receiving data.

18. The networking system of claim 16, wherein the closed operating environment comprises an area within a body of a motor vehicle, an aircraft, or a boat.

19. The networking system of claim 18, wherein the at least one network device comprises at least one data generation device configured to generate data associated with operating the motor vehicle, the aircraft, or the boat.

* * * * *